(12) United States Patent
Yokoyama et al.

(10) Patent No.: US 9,977,220 B2
(45) Date of Patent: May 22, 2018

(54) IMAGE PICKUP OPTICAL SYSTEM AND IMAGE PICKUP APPARATUS INCLUDING THE SAME

(71) Applicant: CANON KABUSHIKI KAISHA, Tokyo (JP)

(72) Inventors: Takayoshi Yokoyama, Utsunomiya (JP); Kentaro Mori, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 15/160,273

(22) Filed: May 20, 2016

(65) Prior Publication Data

US 2016/0349482 A1    Dec. 1, 2016

(30) Foreign Application Priority Data

May 27, 2015 (JP) ................. 2015-106958

(51) Int. Cl.
*G02B 13/00* (2006.01)
*G02B 27/00* (2006.01)

(52) U.S. Cl.
CPC ..... *G02B 13/0035* (2013.01); *G02B 27/0025* (2013.01)

(58) Field of Classification Search
CPC ... G02B 13/0035; G02B 27/0025; G02B 9/12
USPC ........................ 359/716, 689, 784
See application file for complete search history.

(56) References Cited

U.S. PATENT DOCUMENTS 8,976,271 B2    3/2015 Yokoyama et al.
2010/0265380 A1*  10/2010 Fukuta ................. G02B 15/177
                                                      348/335

FOREIGN PATENT DOCUMENTS

JP    2013-7853 A    1/2013
JP    2013-29658 A    2/2013

* cited by examiner

*Primary Examiner* — Jordan Schwartz
*Assistant Examiner* — George G King
(74) *Attorney, Agent, or Firm* — Carter, DeLuca, Farrell & Schmidt LLP

(57) ABSTRACT

An image pickup optical system includes: from an object side to an image side, a first lens unit having a negative refractive power; a second lens unit having a positive refractive power; and a third lens unit having a negative refractive power. The first lens unit includes one negative lens or two negative lenses, the second lens unit includes a positive lens closest to the object side, and includes a plurality of lenses, the third lens unit includes, from the object side to the image side, a negative lens and a positive lens. A focal length f1 of the first lens unit, a focal length f3 of the third lens unit, a focal length fGr of the positive lens included in the third lens unit, an entire lens length L, and a focal length f of the image pickup optical system are set appropriately.

7 Claims, 6 Drawing Sheets

IMAGE PICKUP OPTICAL SYSTEM AND IMAGE PICKUP APPARATUS INCLUDING THE SAME

BACKGROUND OF THE INVENTION

Field of the Invention

The present invention relates to an image pickup optical system, which is suited to be used for an image pickup apparatus such as a silver-halide film camera, a digital still camera, a digital video camera, a monitoring camera, and a TV camera.

Description of the Related Art

In recent years, an image pickup optical system used for an image pickup apparatus is required to have high optical performance, a wide field angle, a large aperture ratio, and the like.

In each of Japanese Patent Application Laid-Open No. 2013-29658 and Japanese Patent Application Laid-Open No. 2013-7853, there is disclosed an image pickup optical system in which, in order from an object side to an image side, a first lens unit having a negative refractive power, a second lens unit having a positive refractive power and including an aperture stop, and a third lens unit having a negative refractive power are arranged.

The image pickup optical system has a refractive power arrangement that is symmetrical with respect to the aperture stop so that off-axis aberrations such as a lateral chromatic aberration, a field curvature, and a distortion, which are caused by the first lens unit, are corrected by the third lens unit. In this manner, good optical performance is obtained. Moreover, in the image pickup optical system, the second lens unit is configured to move to perform focusing.

With the image pickup optical system having the symmetrical refractive power arrangement, it is easy to correct the off-axis aberrations. On the other hand, when an incident angle of a light flux that has passed through the image pickup optical system with respect to an image pickup surface becomes larger, a resolving power is reduced. In particular, when the wide field angle of the image pickup optical system is to be realized, this tendency becomes stronger. In order to reduce an incident angle of an off-axis light flux with respect to the image pickup surface, the third lens unit may include a negative lens and a positive lens, which are arranged in the stated order from the object side, for example.

With this configuration, the incident angle of the off-axis light flux with respect to the image pickup surface may be reduced. Moreover, in order to obtain the high optical performance over an entire image plane, a cancelling action between the aberrations caused by the first lens unit and aberrations caused by the third lens unit needs to be performed satisfactorily. To this end, it is important to appropriately set the negative refractive powers of the first lens unit and the third lens unit, for example.

In the image pickup optical system disclosed in Japanese Patent Application Laid-Open No. 2013-29658, the positive lens included in the third lens unit has a strong positive refractive power so that the incident angle of the off-axis light flux with respect to the image pickup surface may be reduced, but it is difficult to perform the cancellation of the aberrations with the first lens unit in a balanced manner. In addition, a configuration in which an on-axis light flux diverged by the first lens unit enters the second lens unit including the aperture stop is adopted, and hence when an aperture of the image pickup optical system is increased, various aberrations such as a spherical aberration and a coma tend to increase. In the image pickup optical system disclosed in Japanese Patent Application Laid-Open No. 2013-7853, an entire lens length is short, but the refractive powers of the lens units are strong, resulting in increased generation of various aberrations, and in difficulty to obtain a high resolving power over the entire image plane.

SUMMARY OF THE INVENTION

According to one embodiment of the present invention, there is provided an image pickup optical system, including:
a first lens unit having a negative refractive power;
a second lens unit having a positive refractive power; and
a third lens unit having a negative refractive power,
the first lens unit, the second lens unit, and the third lens unit being arranged in the stated order from an object side to an image side,
in which the first lens unit includes one negative lens or two negative lenses,
in which the second lens unit includes a positive lens closest to the object side, and includes a plurality of lenses,
in which the third lens unit includes a negative lens and a positive lens, which are arranged in the stated order from the object side to the image side, and
in which the following conditional expressions are satisfied:

$$0.30 < f1/f3 < 0.90;$$

$$-2.20 < fGr/f3 < -1.00; \text{ and}$$

$$2.00 < L/f < 7.00,$$

where f1 represents a focal length of the first lens unit, f3 represents a focal length of the third lens unit, fGr represents a focal length of the positive lens included in the third lens unit, L represents an entire lens length, and f represents a focal length of the image pickup optical system.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, an image pickup optical system and an image pickup apparatus including the same according to the present invention are described. The image pickup optical system according to the present invention includes: a first lens unit having a negative refractive power; a second lens unit having a positive refractive power; and a third lens unit having a negative refractive power. The first lens unit, the second lens unit, and the third lens unit are arranged in the stated order from an object side to an image side. The first lens unit includes one negative lens or two negative lenses. The second lens unit includes a positive lens closest to the object side, and includes a plurality of lenses. The third lens unit includes a negative lens and a positive lens, which are arranged in the stated order from the object side to the image side.

Figure 1:
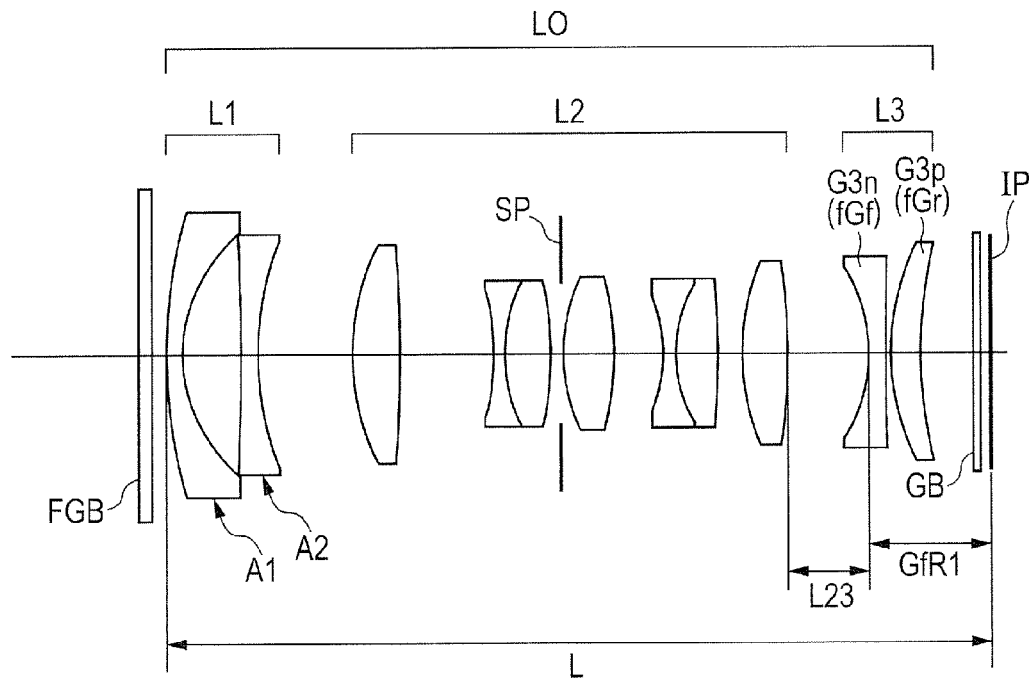
FIG. 1 is a sectional view of a lens according to Example 1 of the present invention.
Figure 2:
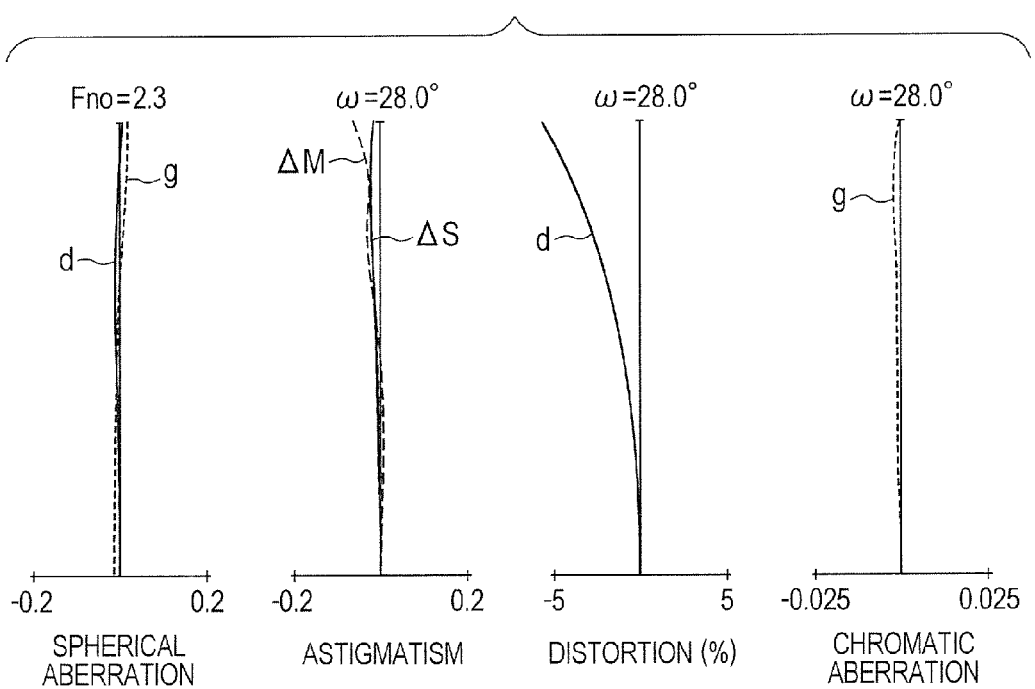
FIG. 2 is aberration diagrams obtained when an object at infinity is brought into focus according to Example 1.
Figure 3:
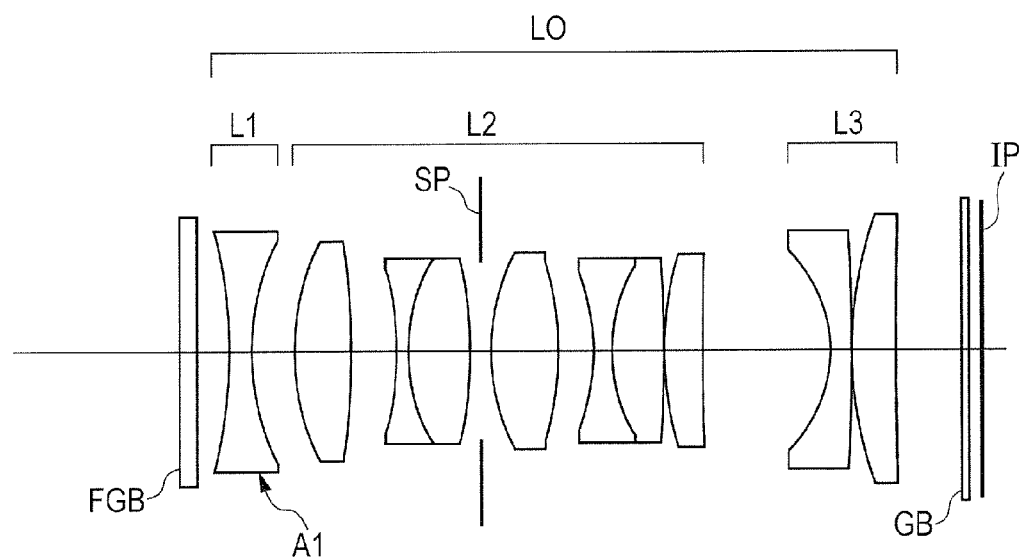
FIG. 3 is a sectional view of a lens according to Example 2 of the present invention.
Figure 4:
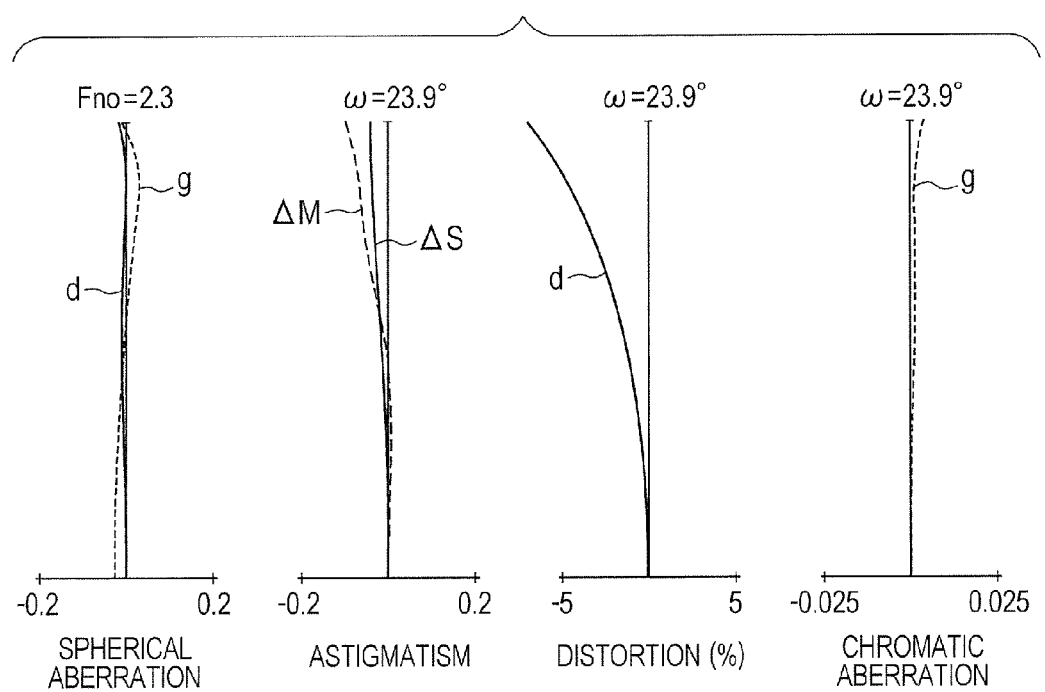
FIG. 4 is aberration diagrams obtained when an object at infinity is brought into focus according to Example 2.
Figure 5:
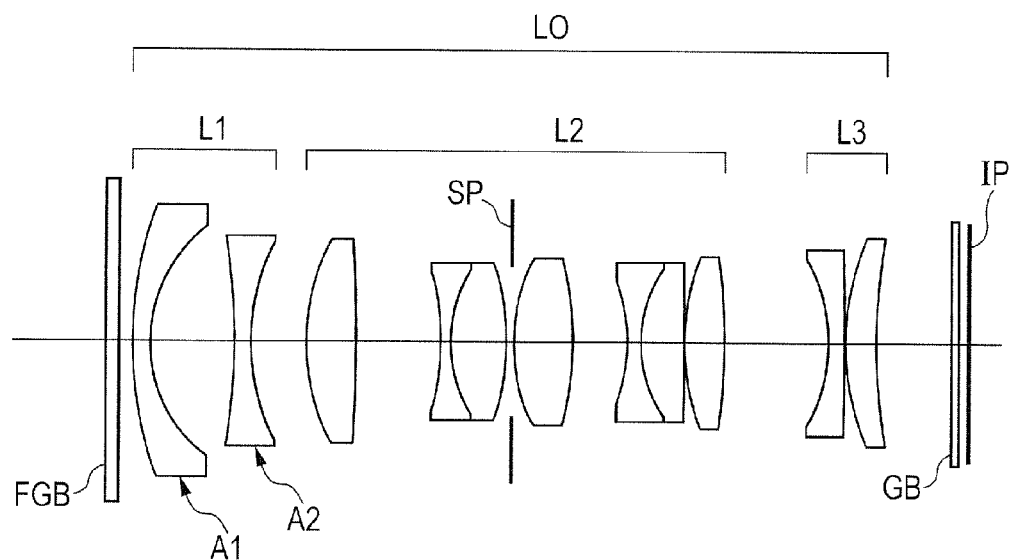
FIG. 5 is a sectional view of a lens according to Example 3 of the present invention.
Figure 6:
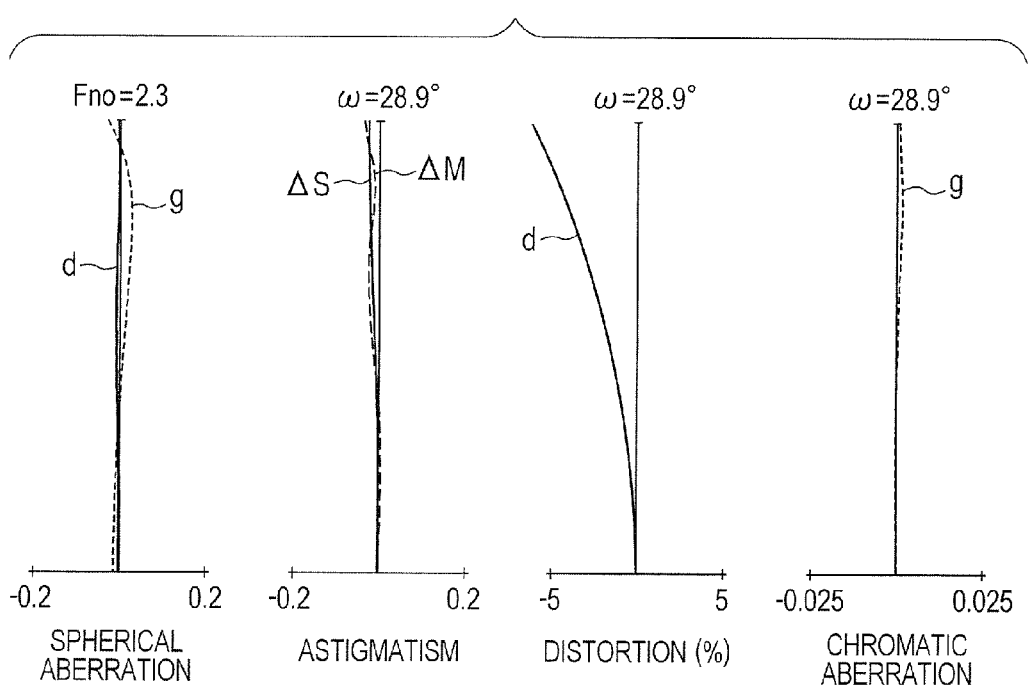
FIG. 6 is aberration diagrams obtained when an object at infinity is brought into focus according to Example 3.

FIG. 1 is a sectional view of a lens according to Example 1 of the present invention. FIG. 2 is aberration diagrams obtained when an object at infinity is brought into focus according to Example 1. FIG. 3 is a sectional view of a lens according to Example 2 of the present invention. FIG. 4 is aberration diagrams obtained when an object at infinity is brought into focus according to Example 2. FIG. 5 is a sectional view of a lens according to Example 3 of the present invention. FIG. 6 is aberration diagrams obtained when an object at infinity is brought into focus according to Example 3.

Figure 7:
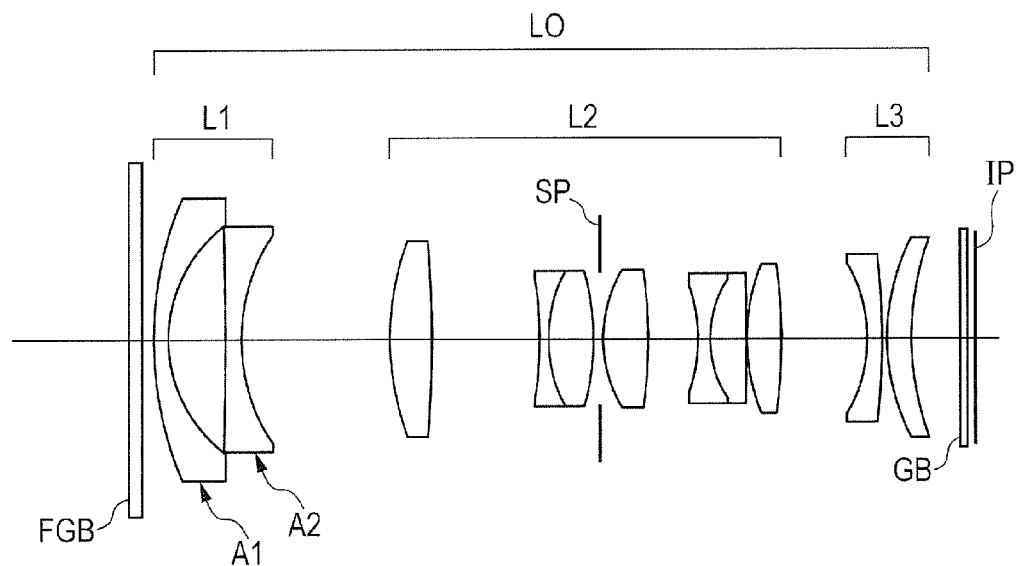
FIG. 7 is a sectional view of a lens according to Example 4 of the present invention.
Figure 8:
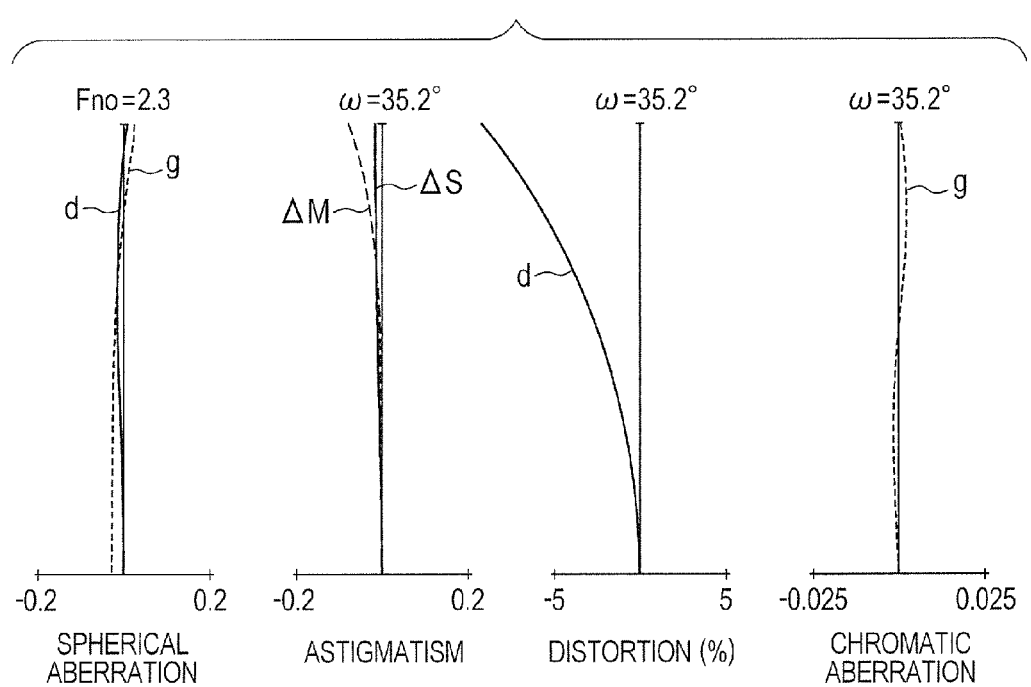
FIG. 8 is aberration diagrams obtained when an object at infinity is brought into focus according to Example 4.
Figure 9:
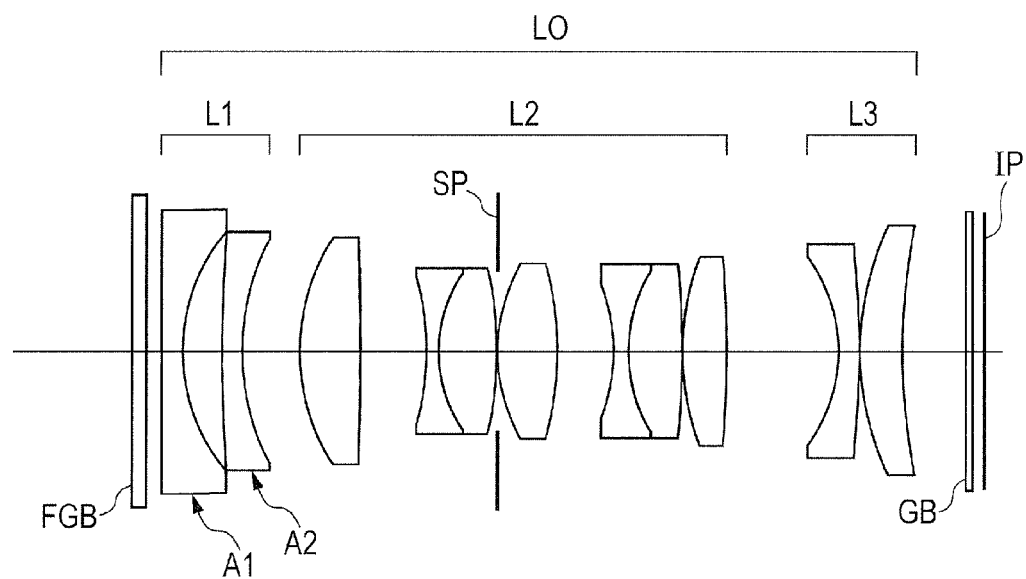
FIG. 9 is a sectional view of a lens according to Example 5 of the present invention.
Figure 10:
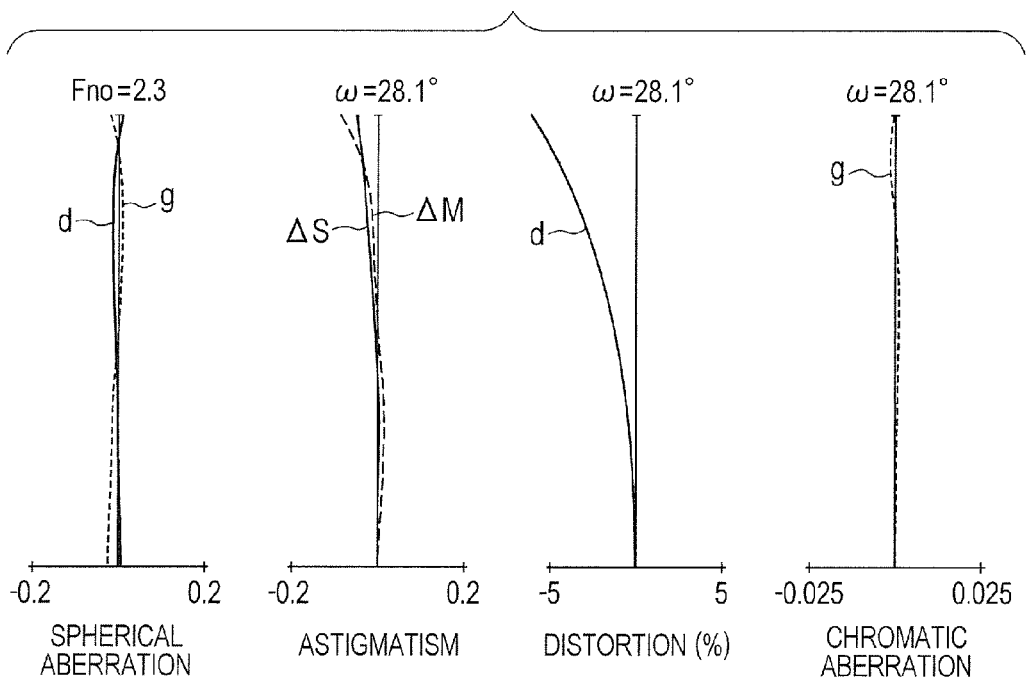
FIG. 10 is aberration diagrams obtained when an object at infinity is brought into focus according to Example 5.
Figure 11:
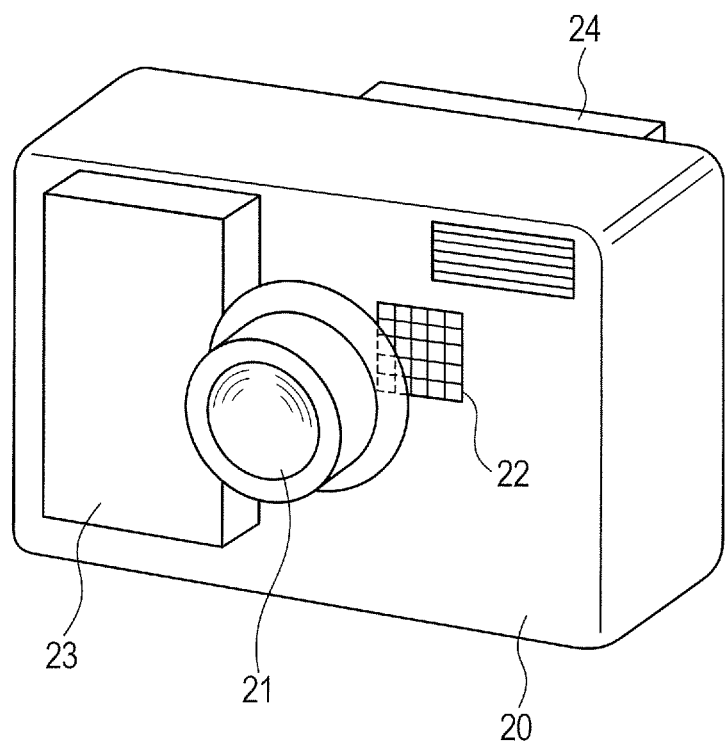
FIG. 11 is a schematic view of a main part of an image pickup apparatus according to the present invention.

FIG. 7 is a sectional view of a lens according to Example 4 of the present invention. FIG. 8 is aberration diagrams obtained when an object at infinity is brought into focus according to Example 4. FIG. 9 is a sectional view of a lens according to Example 5 of the present invention. FIG. 10 is aberration diagrams obtained when an object at infinity is brought into focus according to Example 5. FIG. 11 is a schematic view of a main part of the image pickup apparatus including the image pickup optical system according to the present invention.

The image pickup optical system according to each of Examples is suited to be used for an image pickup apparatus such as a digital still camera, a digital video camera, or a silver-halide film camera. In the sectional view of the lens, the left is the object side (front side) and the right is the image side (rear side). The image pickup optical system of each Example may be used as a projection lens of a projector or the like. In this case, the left is a screen side, and the right is a projected image side.

In the sectional view of the lens, an image pickup optical system LO is illustrated. The image pickup optical system LO includes, in order from an object side to an image side, a first lens unit L1 having a negative refractive power, a second lens unit L2 having a positive refractive power, and a third lens unit L3 having a negative refractive power. An aperture stop SP is arranged among lenses forming the second lens unit L2. At an image plane IP, an image pickup surface of a solid-state image pickup element (photo-electric conversion element) such as a charge coupled device (CCD) sensor or a complementary metal oxide semiconductor (CMOS) sensor is located when the image pickup optical system LO is used as an image pickup optical system for a digital video camera or a digital still camera, and a film surface is located when the image pickup optical system LO is used for a silver-halide film camera.

The first lens unit L1 includes one or two negative lenses. The second lens unit L2 includes a positive lens component arranged on the object side, and includes a plurality of lenses. The term "positive lens component" as used herein refers to a single lens or a cemented lens obtained by cementing a plurality of lenses. More specifically, the second lens unit L2 includes, in order from the object side to the image side, a positive lens, a cemented lens obtained by cementing a negative lens and a positive lens, a positive lens, a cemented lens obtained by cementing a negative lens and a positive lens, and a positive lens.

The third lens unit L3 includes, in order from the object side to the image side, a negative lens and a positive lens. The first lens unit L1, the second lens unit L2, and the third lens unit L3 are configured to move toward the object side in their entirety during focusing from infinity to proximity.

A low-pass filter or an infrared (IR) cut-off filter is denoted by GB, and may be arranged in front of the image pickup surface as needed. In addition, a glass block FGB is arranged closest to the object side to protect the lenses following the glass block FGB. The glass block FGB may be omitted when not needed. Negative lenses A1 and A2 form the first lens unit L1, and are configured to satisfy Conditional Expression (8), which is to be described later.

The respective longitudinal aberration diagrams are illustrations of a spherical aberration, an astigmatism, a distortion, and a lateral chromatic aberration in order from the left. In the longitudinal aberration diagrams for showing the spherical aberration and the lateral chromatic aberration, a solid line d indicates a d-line (587.6 nm), and a double-dashed line g indicates a g-line (435.8 nm). In addition, in the longitudinal aberration diagram for showing the astigmatism, a solid line ΔS indicates a sagittal direction of the d-line, and a broken line ΔM indicates a meridional direction of the d-line. Further, the longitudinal aberration diagram for showing the distortion indicates a distortion in the d-line. Symbol Fno denotes an f-number, and symbol ω denotes a half field angle (degree).

In the image pickup optical system LO according to the present invention, the first lens unit L1 having the negative refractive power and the third lens unit L3 having the negative refractive power are arranged substantially symmetrically with respect to the aperture stop SP to satisfactorily correct off-axis aberrations such as a lateral chromatic aberration, a field curvature, and a distortion. In general, when a symmetrical refractive power arrangement is performed in an image pickup optical system having a wide field angle, an off-axis light flux is diverged by the third lens unit having the negative refractive power, an incident angle of the off-axis light flux with respect to the image pickup surface becomes smaller, and a resolving power is reduced.

To address those problems, in the image pickup optical system LO according to the present invention, the third lens unit L3 includes, in order from the object side to the image side, a negative lens G3n and a positive lens G3p so that a converging action of the positive lens G3p prevents the incident angle of an off-axis light flux with respect to the image pickup surface from becoming larger. At this time, when a refractive power of the positive lens G3p is not appropriate, the cancelling of the aberrations between the first lens unit L1 and the third lens unit L3 becomes insufficient, the off-axis aberrations are increased, and the resolving power is reduced. In order to attain high image quality over an entire image plane, it becomes necessary to appropriately set the refractive powers of the first lens unit L1 and the third lens unit L3, and the refractive power of the positive lens G3p included in the third lens unit L3.

In view of the above-mentioned circumstances, in the image pickup optical system according to the present invention, a focal length of the first lens unit L1 is represented by f1, a focal length of the third lens unit L3 is represented by f3, a focal length of the positive lens G3p included in the third lens unit L3 is represented by fGr, an entire lens length is represented by L, and a focal length of the image pickup optical system is represented by f. With the above-mentioned settings, the following conditional expressions are satisfied.

$$0.30 < f1/f3 < 0.90 \quad (1)$$

$$-2.20 < fGr/f3 < -1.00 \quad (2)$$

$$2.00 < L/f < 7.00 \quad (3)$$

Next, technical meanings of the respective conditional expressions are described. Conditional Expression (1) relates to a ratio between the refractive powers of the first lens unit L1 having the negative refractive power and the third lens unit L3 having the negative refractive power, and is mainly intended to realize the high image quality. When the ratio falls below the lower limit value of Conditional Expression (1), the symmetry of the refractive power arrangement is lost, and it becomes difficult to correct the off-axis aberrations. In addition, the negative refractive power of the third lens unit L3 becomes too weak, that is, an absolute value of the negative refractive power becomes too small, with the result that a back focus becomes longer, and that the entire lens length is increased.

Here, the entire lens length L is obtained by adding a value of an air-equivalent back focus BF to a distance from a lens surface on the object side of a lens having a refractive power and being closest to the object side to the last lens surface.

When the ratio exceeds the upper limit value of Conditional Expression (1), and the negative refractive power of the third lens unit L3 becomes too strong, that is, the absolute value of the negative refractive power becomes too large, the incident angle of the off-axis light flux with respect to the image pickup surface becomes smaller, and the resolving power is reduced. It is preferred that the numerical value range of Conditional Expression (1) be set as follows:

$$0.32 < f1/f3 < 0.85 \quad (1a).$$

Conditional Expression (2) relates to a ratio between the focal length of the third lens unit L3 and the focal length of the positive lens G3p included in the third lens unit L3. Moreover, Conditional Expression (2) is mainly intended to obtain high optical performance through appropriately setting the incident angle of the off-axis light flux with respect to the image pickup surface. When the ratio falls below the lower limit value of Conditional Expression (2), and a positive refractive power of the positive lens G3p included in the third lens unit L3 becomes weaker, the incident angle of the off-axis light flux with respect to the image pickup surface becomes smaller, and the resolving power is reduced.

When the ratio exceeds the upper limit value of Conditional Expression (2), and the positive refractive power of the positive lens G3p included in the third lens unit L3 becomes stronger, large off-axis aberrations are caused by the first lens unit L1, with the result that it becomes difficult to cancel the off-axis aberrations with the third lens unit L3, and the optical performance is reduced. It is preferred that the numerical value range of Conditional Expression (2) be set as follows:

$$-2.15 < fGr/f3 < -1.02 \quad (2a).$$

Conditional Expression (3) relates to the entire lens length. When the ratio falls below the lower limit of Conditional Expression (3), and the entire lens length becomes shorter, the refractive powers of the lens units become too strong, that is, absolute values of the refractive powers become too large, various aberrations are increased, and the resolving power is reduced. In particular, the positive refractive power of the second lens unit L2 becomes too strong, and when a large aperture ratio is to be realized, a spherical aberration and a coma are increased. When the ratio exceeds the upper limit value of Conditional Expression (3), and the entire lens length becomes too long, the entire lens system is disadvantageously increased in size.

It is preferred that the numerical value range of Conditional Expression (3) be set as follows:

$$2.10 < L/f < 6.50 \quad (3a).$$

It is more preferred that the numerical value range of Conditional Expression (3a) be set as follows:

$$2.10 < L/f < 6.00 \quad (3b).$$

With the above-mentioned configuration, the image pickup optical system having the wide field angle, the large aperture ratio, and the high optical performance can be obtained. In each Example, it is further preferred that at least one of Conditional Expressions provided below be satisfied.

A distance on an optical axis from a lens surface on the object side of the negative lens G3n included in the third lens unit L3 to the image plane is represented by GfR1. Note that, in regard to the distance GfR1, when a glass block with no refractive power is arranged between the last lens surface to the image plane, a thickness of the glass block has an air-equivalent value. A focal length of the second lens unit L2 is represented by f2. A focal length of the negative lens included in the third lens unit L3 is represented by fGf.

A distance on the optical axis from a lens surface on the image side of a lens closest to the image side in the second lens unit L2 to the lens surface on the object side of the negative lens included in the third lens unit L3 is represented by L23. An Abbe number and a partial dispersion ratio of a material of the negative lenses included in the first lens unit L1 are represented by νdi and θgFi, respectively. At this time, it is preferred that at least one negative lens included in the first lens unit L1 satisfy Conditional Expression (8) provided below.

Other than the above, it is preferred that at least one of Conditional Expressions (4) to (7) provided below be satisfied.

$$0.30 < GfR1/f < 0.85 \quad (4)$$

$$0.55 < f2/f < 1.75 \quad (5)$$

$$-2.20 < fGf/f < -0.60 \quad (6)$$

$$0.30 < L23/f < 0.60 \quad (7)$$

$$0.5826 < \theta gFi + 0.001618 \times (\nu di - 36.23) < 0.8000 \quad (8)$$

Next, technical meanings of the respective conditional expressions are described. Conditional Expression (4) relates to the distance from the lens surface on the object side of the negative lens G3n to the image plane. In each Example, the third lens unit L3 is a lens unit at which a difference between a height of incidence of an on-axis light flux from the optical axis and a height of incidence of the off-axis light flux from the optical axis is large. Using this fact, correction of the aberrations is performed on the off-axis light flux while reducing reductions in aberrations of the on-axis light flux to obtain good optical performance from the center of the image plane to the periphery of the image plane.

When the ratio falls below the lower limit value of Conditional Expression (4), and the third lens unit L3 is brought too close to the image pickup surface, because the third lens unit L3 has the negative refractive power, the incident angle of the off-axis light flux with respect to the image pickup surface becomes smaller, and the resolving power is reduced. When the ratio exceeds the upper limit value of Conditional Expression (4), and the third lens unit L3 is located on the object side, separation between the on-axis light flux and the off-axis light flux becomes insufficient, and it becomes difficult to realize the high image quality over the entire image plane.

It is preferred that the numerical value range of Conditional Expression (4) be set as follows.

$$0.35 < GfR1/f < 0.80 \quad (4a)$$

It is more preferred that the numerical value range of Conditional Expression (4a) be set as follows.

$$0.40 < GfR1/f < 0.75 \quad (4b)$$

Conditional Expression (5) relates to a ratio between the focal length of the second lens unit L2 and the focal length of the entire system. Conditional Expression (5) is intended to realize the high image quality while realizing the large aperture ratio. When the ratio falls below the lower limit value of Conditional Expression (5), and the positive refractive power of the second lens unit L2 becomes too strong, the spherical aberration and the coma are increased, and the resolving power is reduced.

In particular, when the large aperture ratio is to be realized, the optical performance is significantly reduced. When the ratio exceeds the upper limit value of Conditional Expression (5), and the positive refractive power of the second lens unit L2 becomes weaker, the image pickup optical system is increased in size. It is preferred that the numerical value range of Conditional Expression (5) be set as follows.

$$0.60 < f2/f < 1.75 \quad (5a)$$

It is more preferred that the numerical value range of Conditional Expression (5a) be set as follows.

$$0.65 < f2/f < 1.70 \quad (5b)$$

Conditional Expression (6) relates to the focal length of the negative lens G3n of the third lens unit L3. When the ratio falls below the lower limit value of Conditional Expression (6), and a negative refractive power of the negative lens G3n becomes too weak, large off-axis aberrations are caused by the first lens unit L1, and it becomes difficult to correct the off-axis aberrations by the third lens unit L3. When the ratio exceeds the upper limit value of Conditional Expression (6), and the negative refractive power of the negative lens G3n becomes too strong, the off-axis aberrations caused by the first lens unit L1 is overcorrected by the third lens unit L3, and the optical performance is reduced.

It is preferred that the numerical value range of Conditional Expression (6) be set as follows:

$$-2.10 < fGf/f < -0.65 \quad (6a).$$

It is more preferred that the numerical value range of Conditional Expression (6a) be set as follows:

$$-2.05 < fGf/f < -0.70 \quad (6b).$$

Conditional Expression (7) relates to an interval between the second lens unit L2 and the third lens unit L3. As described above, the third lens unit L3 is arranged at a position where the height of incidence of the on-axis light flux and the height of incidence of the off-axis light flux are separated to correct the aberrations of the off-axis light flux while reducing the reductions in aberrations of the on-axis light flux. In this manner, the good optical performance is obtained over the entire image plane.

When the ratio falls below the lower limit value of Conditional Expression (7), and the interval between the second lens unit L2 and the third lens unit L3 becomes too narrow, the separation between the height of incidence of the on-axis light flux and the height of incidence of the off-axis light flux becomes insufficient, and it becomes difficult to obtain good performance over the entire image plane. When the ratio exceeds the upper limit value of Conditional Expression (7), and the interval between the second lens unit L2 and the third lens unit L3 becomes too wide, the entire lens system is increased in size.

Conditional Expression (8) relates to the material of the at least one of the negative lenses forming the first lens unit L1. Conditional Expression (8) is mainly intended to satisfactorily correct the lateral chromatic aberration. A material that satisfies Conditional Expression (8) is anomalously dispersive. Anomalous dispersion, which is required to reduce secondary spectra, exhibited by a material that falls outside the range of Conditional Expression (8) is disadvantageously low. When the anomalous dispersion is low, a secondary spectrum of the lateral chromatic aberration is increased, and it becomes difficult to correct the secondary spectrum.

In each of Examples 1 and 3 to 5, the first lens unit L1 includes two negative lenses. In each of Examples 1 and 3 to 5, the two negative lenses: the negative lens A1 and the negative lens A2 satisfy Conditional Expression (8), but the at least one negative lens only needs to satisfy Conditional Expression (8).

Next, lens configurations of the lens units in each Example are described. In the following description, it is assumed that lenses forming each of the lens units are arranged in order from the object side to the image side. In each Example, in order from the object side to the image side, the first lens unit L1 having the negative refractive power, the second lens unit L2 having the positive refractive power, and the third lens unit L3 having the negative refractive power are included. The aperture stop SP is arranged within the second lens unit L2. In order to protect lenses having refractive powers, the glass block FGB is arranged closest to the object side. The glass block FGB may not be used when not needed.

Example 1

Example 1 is described. An image pickup optical system according to Example 1 has a focal length of 33.35 mm, and an f-number of 2.30. The first lens unit L1 includes a negative lens A1 having a meniscus shape with a convex surface thereof facing the object side, and a negative lens A2 having a biconcave shape. Anomalous partial dispersion glass is used as a material of the negative lens A1 and the negative lens A2 of the first lens unit L1 to satisfactorily correct the lateral chromatic aberration.

The second lens unit L2 includes a positive lens (positive lens component) having a biconvex shape, a cemented lens obtained by cementing a negative lens having a biconcave shape and a positive lens having a biconvex shape, an aperture stop SP, a positive lens having a biconvex shape, and a cemented lens obtained by cementing a negative lens having a biconcave shape and a positive lens having a biconvex shape. The second lens unit L2 also includes a positive lens having a biconvex shape.

The third lens unit L3 includes a negative lens G3n having a meniscus shape with a convex surface thereof facing the image side, and a positive lens G3p having a meniscus shape with a convex surface thereof facing the object side. A lens surface on the image side of the negative lens G3n has an aspherical shape. As described above, the third lens unit L3 is arranged at the position where the height of incidence of the on-axis light flux and the height of incidence of the off-axis light flux are separated, and the off-axis aberrations such as the field curvature and the distortion are satisfactorily corrected with the aspherical surface.

Example 2

An image pickup optical system according to Example 2 has a focal length of 40.0 mm, and an f-number of 2.30. In Example 2, the first lens unit L1 includes a negative lens A1 having a biconcave shape. Anomalous partial dispersion glass is used as a material of the negative lens A1 of the first lens unit L1 to satisfactorily correct the lateral chromatic aberration.

The second lens unit L2 includes a positive lens (positive lens component) having a biconvex shape, a cemented lens obtained by cementing a negative lens having a biconcave shape and a positive lens having a biconvex shape, an aperture stop SP, a positive lens having a biconvex shape, and a cemented lens obtained by cementing a negative lens having a biconcave shape and a positive lens having a biconvex shape. The second lens unit L2 also includes a positive lens having a meniscus shape with a convex surface thereof facing the object side. A lens configuration of the third lens unit L3 is the same as in Example 1. An approach to obtain the image pickup optical system having the wide field angle, the large aperture ratio, and the high image quality is similar to Example 1.

Example 3

An image pickup optical system according to Example 3 has a focal length of 32.13 mm and an f-number of 2.30. A lens configuration of the first lens unit L1 is the same as in Example 1. The second lens unit L2 includes a positive lens (positive lens component) having a biconvex shape, and a cemented lens obtained by cementing a negative lens having a biconcave shape and a positive lens having a biconvex shape. The second lens unit L2 also includes an aperture stop SP, a positive lens having a biconvex shape, a cemented lens obtained by cementing a negative lens having a biconcave shape and a positive lens having a meniscus shape with a convex surface thereof facing the object side, and a positive lens having a biconvex shape. A lens configuration of the third lens unit L3 is the same as in Example 1. An approach to obtain the image pickup optical system having the wide field angle, the large aperture ratio, and the high image quality is similar to Example 1.

Example 4

An image pickup optical system according to Example 4 has a focal length of 25.2 mm and an f-number of 2.30. A lens configuration of the first lens unit L1 is the same as in Example 1. The second lens unit L2 includes a positive lens (positive lens component) having a biconvex shape, and a cemented lens obtained by cementing a negative lens having a biconcave shape and a positive lens having a biconvex shape. The second lens unit L2 also includes an aperture stop SP, a positive lens having a biconvex shape, a cemented lens obtained by cementing a negative lens having a biconcave shape and a positive lens having a meniscus shape with a convex surface thereof facing the object side, and a positive lens having a biconvex shape. A lens configuration of the third lens unit L3 is the same as in Example 1. An approach to obtain the image pickup optical system having the wide field angle, the large aperture ratio, and the high image quality is similar to Example 1.

Example 5

An image pickup optical system according to Example 5 has a focal length of 33.3 mm and an f-number of 2.30. The first lens unit L1 includes a negative lens A1 having a biconcave shape, and a negative lens A2 having a meniscus shape with a convex surface thereof facing the object side. Anomalous partial dispersion glass is used as a material of the negative lens A1 and the negative lens A2 of the first lens unit L1 to satisfactorily correct the lateral chromatic aberration. A lens configuration of the second lens unit L2 is the same as in Example 1. A lens configuration of the third lens unit L3 is the same as in Example 1. An approach to obtain the image pickup optical system having the wide field angle, the large aperture ratio, and the high image quality is similar to Example 1.

The exemplary embodiments of the present invention are described above, but the present invention is not limited to those embodiments and can be modified and changed variously within the scope of the gist thereof.

Next, an example in which a digital still camera is used as an example of the image pickup apparatus according to the present invention is described with reference to FIG. 11.

In FIG. 11, a camera main body 20, and an image pickup optical system 21 according to the present invention are illustrated. A solid-state image pickup element (photo-electric conversion element) 22, such as a CCD sensor or a CMOS sensor, is included in the camera main body, and is configured to receive light of a subject image formed by the image pickup optical system 21.

A memory 23 is configured to record information corresponding to the subject image, which has been photoelectrically converted by the image pickup element 22. A viewfinder 24, which is formed of a liquid crystal display panel or the like, is used to observe the subject image formed on the solid-state image pickup element 22. In this manner, according to the present invention, the image pickup apparatus that is compact and has the high optical performance can be obtained.

Specific Numerical Data of Examples 1 to 5 are described below. In each Example, i indicates the order from the object side, ri indicates the curvature radius of an i-th optical surface (i-th surface), di indicates an on-axis interval between the i-th surface and an (i+1)th surface, and ndi and vdi indicate the refractive index and Abbe number of a material of an i-th optical member with respect to the d-line, respectively. An aspherical shape is expressed by the following equation, where the X-axis represents an optical axis direction, the H-axis represents an axis in a direction perpendicular to the optical axis, a travelling direction of light is positive, R represents a paraxial curvature radius, K represents a conic constant, and A4, A6, A8, A10, and A12 represent aspherical coefficients, respectively.

$$X = \frac{H^2/R}{1 + \sqrt{1-(1+K)(H/R)^2}} + A4H^4 + A6H^6 + A8H^8 + A10H^{10} + A12H^{12}$$

The asterisk (*) indicates a surface having an aspherical shape. The notation "e-x" indicates $10^{-x}$. The notation "BF" indicates the air-equivalent back focus. The entire lens length is a value obtained by adding the back focus to a distance from the first lens surface to the last lens surface. Moreover, a relationship between Conditional Expressions described above and Numerical Data is shown in Table 1.

Example 1

Unit mm

Surface Data

| Surface number | r | d | nd | vd | Effective diameter |
|---|---|---|---|---|---|
| 1 | ∞ | 2.00 | 1.51633 | 64.1 | 49.08 |
| 2 | ∞ | 2.00 | | | 47.71 |
| 3 | 74.105 | 2.50 | 1.43875 | 94.9 | 42.02 |
| 4 | 23.902 | 8.81 | | | 35.19 |
| 5 | −257.986 | 2.50 | 1.49700 | 81.5 | 34.92 |
| 6 | 46.595 | 14.20 | | | 33.09 |
| 7 | 36.182 | 7.07 | 1.85478 | 24.8 | 31.95 |
| 8 | −358.222 | 14.27 | | | 30.49 |
| 9 | −39.018 | 1.50 | 1.85478 | 24.8 | 19.14 |
| 10 | 22.835 | 7.08 | 1.59522 | 67.7 | 19.70 |
| 11 | −49.957 | 1.31 | | | 20.82 |
| 12 (Stop) | ∞ | 0.49 | | | 21.37 |
| 13 | 27.871 | 7.64 | 1.59522 | 67.7 | 21.99 |
| 14 | −45.955 | 7.26 | | | 21.24 |
| 15 | −26.107 | 2.00 | 1.65412 | 39.7 | 16.89 |
| 16 | 21.324 | 6.29 | 1.59522 | 67.7 | 19.51 |
| 17 | −132.424 | 3.64 | | | 21.34 |
| 18 | 35.305 | 6.75 | 1.80809 | 22.8 | 26.35 |
| 19 | −127.887 | 12.45 | | | 26.36 |
| 20 | −23.734 | 2.50 | 1.83400 | 37.2 | 24.79 |
| 21* | −318.910 | 0.68 | | | 27.58 |
| 22 | 37.766 | 4.46 | 1.90366 | 31.3 | 31.71 |
| 23 | 63.653 | 7.99 | | | 31.68 |
| 24 | ∞ | 1.00 | 1.51000 | 63.0 | 34.49 |
| 25 | ∞ | 1.50 | | | 34.80 |
| Image plane | ∞ | | | | |

Aspherical surface data
Twenty-first surface

K = 0.00000e+000   A4 = 1.76765e−005   A6 = −1.57841e−008
A8 = −2.15323e−011   A10 = −1.31600e−013   A12 = 1.65866e−016

Various data

| Focal length | 33.35 |
|---|---|
| F-number | 2.30 |
| Half field angle (degree) | 28.04 |
| Image height | 17.76 |
| Entire lens length | 123.56 |
| BF | 10.15 |
| Entrance pupil position | 35.88 |
| Exit pupil position | −38.80 |
| Front principal point position | 41.64 |
| Rear principal point position | −31.85 |

Single lens data

| Lens | First surface | Focal length |
|---|---|---|
| 1 | 1 | 0.00 |
| 2 | 3 | −81.65 |
| 3 | 5 | −79.19 |
| 4 | 7 | 38.77 |
| 5 | 9 | −16.67 |
| 6 | 10 | 27.32 |
| 7 | 13 | 30.32 |
| 8 | 15 | −17.65 |
| 9 | 16 | 31.34 |
| 10 | 18 | 34.88 |
| 11 | 20 | −30.87 |
| 12 | 22 | 95.00 |
| 13 | 24 | 0.00 |

Example 2

Unit mm

Surface Data

| Surface number | r | d | nd | vd | Effective diameter |
|---|---|---|---|---|---|
| 1 | ∞ | 2.00 | 1.51633 | 64.1 | 31.04 |
| 2 | ∞ | 4.00 | | | 29.86 |
| 3 | −56.350 | 2.50 | 1.59522 | 67.7 | 27.70 |
| 4 | 28.800 | 5.26 | | | 25.33 |
| 5 | 30.255 | 6.72 | 1.85478 | 24.8 | 25.55 |
| 6 | −89.027 | 5.30 | | | 24.34 |
| 7 | −40.225 | 1.50 | 1.85478 | 24.8 | 20.03 |
| 8 | 22.434 | 7.35 | 1.59522 | 67.7 | 20.45 |
| 9 | −52.004 | 1.30 | | | 21.47 |
| 10 (Stop) | ∞ | 1.11 | | | 21.92 |
| 11 | 25.152 | 8.15 | 1.59522 | 67.7 | 22.61 |
| 12 | −42.481 | 4.35 | | | 21.56 |
| 13 | −25.730 | 2.00 | 1.61340 | 44.3 | 18.26 |
| 14 | 19.639 | 6.34 | 1.59522 | 67.7 | 20.05 |
| 15 | −184.458 | 0.15 | | | 21.21 |
| 16 | 40.933 | 4.55 | 1.84666 | 23.9 | 22.20 |
| 17 | 367.010 | 15.35 | | | 22.19 |
| 18 | −16.588 | 2.50 | 1.65412 | 39.7 | 22.64 |
| 19* | −135.429 | 0.15 | | | 27.26 |
| 20 | 49.956 | 5.23 | 1.90366 | 31.3 | 30.80 |
| 21 | 506.948 | 7.72 | | | 31.38 |
| 22 | ∞ | 1.00 | 1.51000 | 63.0 | 34.60 |
| 23 | ∞ | 1.50 | | | 34.88 |
| Image plane | ∞ | | | | |

Aspherical surface data
Nineteenth surface

K = 0.00000e+000   A4 = 1.75209e−005   A6 = −3.68607e−008
A8 = −2.01974e−011   A10 = 5.43609e−014   A12 = −1.30678e−016

Various data

| Focal length | 40.00 |
|---|---|
| F-number | 2.30 |
| Half field angle (degree) | 23.94 |
| Image height | 17.76 |
| Entire lens length | 89.70 |
| BF | 9.88 |
| Entrance pupil position | 22.82 |
| Exit pupil position | −36.98 |
| Front principal point position | 21.23 |
| Rear principal point position | −38.50 |

Single lens data

| Lens | First surface | Focal length |
|---|---|---|
| 1 | 1 | 0.00 |
| 2 | 3 | −31.67 |
| 3 | 5 | 27.12 |
| 4 | 7 | −16.66 |

-continued

| Unit mm | | |
|---|---|---|
| 5 | 8 | 27.34 |
| 6 | 11 | 27.79 |
| 7 | 13 | −17.86 |
| 8 | 14 | 30.17 |
| 9 | 16 | 54.07 |
| 10 | 18 | −29.14 |
| 11 | 20 | 60.99 |
| 12 | 22 | 0.00 |

Example 3

| Unit mm | | | | |
|---|---|---|---|---|
| Surface Data | | | | |
| Surface number | r | d | nd | vd | Effective diameter |
| 1 | ∞ | 2.00 | 1.51633 | 64.1 | 46.70 |
| 2 | ∞ | 2.00 | | | 45.28 |
| 3 | 57.936 | 2.50 | 1.43875 | 94.9 | 38.96 |
| 4 | 20.805 | 12.44 | | | 32.10 |
| 5 | −99.353 | 2.50 | 1.49700 | 81.5 | 29.99 |
| 6 | 32.600 | 8.21 | | | 28.22 |
| 7 | 31.904 | 7.36 | 1.85478 | 24.8 | 28.92 |
| 8 | −266.663 | 12.81 | | | 27.46 |
| 9 | −37.469 | 1.50 | 1.85478 | 24.8 | 19.87 |
| 10 | 21.828 | 8.21 | 1.59522 | 67.7 | 20.76 |
| 11 | −37.801 | 0.71 | | | 22.28 |
| 12 (Stop) | ∞ | 0.48 | | | 22.90 |
| 13 | 29.318 | 8.75 | 1.59522 | 67.7 | 23.66 |
| 14 | −50.014 | 8.10 | | | 22.82 |
| 15 | −28.994 | 2.00 | 1.65412 | 39.7 | 18.10 |
| 16 | 19.124 | 6.59 | 1.59522 | 67.7 | 20.78 |
| 17 | 818.847 | 0.19 | | | 22.54 |
| 18 | 38.982 | 5.76 | 1.80809 | 22.8 | 24.26 |
| 19 | −97.219 | 15.39 | | | 24.60 |
| 20 | −27.518 | 2.50 | 1.83400 | 37.2 | 24.48 |
| 21* | −134.901 | 0.15 | | | 26.75 |
| 22 | 42.081 | 4.46 | 1.90366 | 31.3 | 29.70 |
| 23 | 88.385 | 11.39 | | | 29.90 |
| 24 | ∞ | 1.00 | 1.51000 | 63.0 | 34.52 |
| 25 | ∞ | 1.50 | | | 34.82 |
| Image plane | ∞ | | | | |

Aspherical surface data
Twenty-first surface

K = 0.00000e+000  A4 = 1.63931e−005  A6 = −2.13156e−009
A8 = 9.75212e−011  A10 = −5.27212e−013  A12 = 7.10561e−016

| Various data | |
|---|---|
| Focal length | 32.13 |
| F-number | 2.30 |
| Half field angle (degree) | 28.93 |
| Image height | 17.76 |
| Entire lens length | 124.16 |
| BF | 13.55 |
| Entrance pupil position | 32.99 |
| Exit pupil position | −46.99 |
| Front principal point position | 43.83 |
| Rear principal point position | −30.63 |

| Single lens data | | |
|---|---|---|
| Lens | First surface | Focal length |
| 1 | 1 | 0.00 |
| 2 | 3 | −75.54 |
| 3 | 5 | −49.08 |
| 4 | 7 | 33.72 |
| 5 | 9 | −15.95 |

-continued

| Unit mm | | |
|---|---|---|
| 6 | 10 | 24.51 |
| 7 | 13 | 32.39 |
| 8 | 15 | −17.33 |
| 9 | 16 | 32.80 |
| 10 | 18 | 35.10 |
| 11 | 20 | −41.89 |
| 12 | 22 | 85.00 |
| 13 | 24 | 0.00 |

Example 4

| Unit mm | | | | | |
|---|---|---|---|---|---|
| Surface Data | | | | | |
| Surface number | r | d | nd | vd | Effective diameter |
| 1 | ∞ | 2.00 | 1.51633 | 64.1 | 56.78 |
| 2 | ∞ | 2.00 | | | 55.02 |
| 3 | 59.284 | 2.50 | 1.59522 | 67.7 | 45.04 |
| 4 | 24.020 | 9.43 | | | 36.78 |
| 5 | −439.473 | 2.50 | 1.49700 | 81.5 | 36.42 |
| 6 | 30.963 | 24.57 | | | 33.01 |
| 7 | 48.918 | 6.86 | 1.85478 | 24.8 | 31.43 |
| 8 | −167.692 | 17.66 | | | 30.18 |
| 9 | −58.295 | 1.50 | 1.85478 | 24.8 | 20.18 |
| 10 | 26.123 | 7.14 | 1.59522 | 67.7 | 20.57 |
| 11 | −42.770 | 1.10 | | | 21.47 |
| 12 (Stop) | ∞ | 0.47 | | | 21.69 |
| 13 | 23.514 | 7.61 | 1.49700 | 81.5 | 21.97 |
| 14 | −65.975 | 8.05 | | | 20.81 |
| 15 | −30.108 | 2.00 | 1.65412 | 39.7 | 15.99 |
| 16 | 18.566 | 5.89 | 1.49700 | 81.5 | 18.30 |
| 17 | 453.844 | 0.15 | | | 20.55 |
| 18 | 33.973 | 5.62 | 1.80809 | 22.8 | 22.58 |
| 19 | −107.417 | 14.20 | | | 23.05 |
| 20 | −24.817 | 2.50 | 1.83400 | 37.2 | 24.23 |
| 21* | −62.995 | 0.68 | | | 26.83 |
| 22 | 35.061 | 4.01 | 1.90366 | 31.3 | 31.92 |
| 23 | 47.048 | 8.05 | | | 31.66 |
| 24 | ∞ | 1.00 | 1.51000 | 63.0 | 34.41 |
| 25 | ∞ | 1.50 | | | 34.74 |
| Image plane | ∞ | | | | |

Aspherical surface data
Twenty-first surface

K = 0.00000e+000  A4 = 1.75477e−005  A6 = 1.13382e−008
A8 = −5.29848e−011  A10 = −1.45868e−013  A12 = 2.76845e−016

| Various data | |
|---|---|
| Focal length | 25.20 |
| F-number | 2.30 |
| Half field angle (degree) | 35.18 |
| Image height | 17.76 |
| Entire lens length | 134.66 |
| BF | 10.21 |
| Entrance pupil position | 33.34 |
| Exit pupil position | −41.51 |
| Front principal point position | 43.77 |
| Rear principal point position | −23.70 |

| Single lens data | | |
|---|---|---|
| Lens | First surface | Focal length |
| 1 | 1 | 0.00 |
| 2 | 3 | −69.68 |
| 3 | 5 | −58.10 |
| 4 | 7 | 44.96 |
| 5 | 9 | −20.93 |

-continued

| Unit mm | | |
|---|---|---|
| 6 | 10 | 28.34 |
| 7 | 13 | 35.89 |
| 8 | 15 | −17.28 |
| 9 | 16 | 38.78 |
| 10 | 18 | 32.52 |
| 11 | 20 | −50.61 |
| 12 | 22 | 131.42 |
| 13 | 24 | 0.00 |

Example 5

| Unit mm | | | | |
|---|---|---|---|---|
| Surface Data | | | | |
| Surface number | r | d | nd | vd | Effective diameter |
| 1 | ∞ | 2.00 | 1.51633 | 64.1 | 38.58 |
| 2 | ∞ | 2.00 | | | 37.20 |
| 3 | −756.254 | 2.50 | 1.43875 | 94.9 | 35.16 |
| 4 | 23.669 | 5.18 | | | 29.56 |
| 5 | 241.465 | 2.50 | 1.49700 | 81.5 | 29.39 |
| 6 | 30.573 | 7.47 | | | 27.83 |
| 7 | 27.483 | 7.80 | 1.85478 | 24.8 | 28.34 |
| 8 | −257.430 | 8.51 | | | 26.58 |
| 9 | −37.126 | 1.50 | 1.85478 | 24.8 | 18.81 |
| 10 | 18.430 | 7.50 | 1.59522 | 67.7 | 19.36 |
| 11 | −48.707 | 0.10 | | | 20.61 |
| 12 (Stop) | ∞ | 0.10 | | | 20.95 |
| 13 | 25.327 | 7.70 | 1.59522 | 67.7 | 21.67 |
| 14 | −44.495 | 7.24 | | | 20.95 |
| 15 | −23.719 | 2.00 | 1.65412 | 39.7 | 16.63 |
| 16 | 19.603 | 6.90 | 1.59522 | 67.7 | 18.93 |
| 17 | −119.930 | 0.15 | | | 21.14 |
| 18 | 36.095 | 5.70 | 1.80809 | 22.8 | 23.16 |
| 19 | −117.895 | 14.52 | | | 23.43 |
| 20 | −20.283 | 2.50 | 1.83481 | 42.7 | 23.28 |
| 21* | −79.446 | 0.30 | | | 26.62 |
| 22 | 39.556 | 5.35 | 1.88300 | 40.8 | 31.29 |
| 23 | 87.585 | 7.98 | | | 31.51 |
| 24 | ∞ | 1.00 | 1.51000 | 63.0 | 34.53 |
| 25 | ∞ | 1.50 | | | 34.83 |
| Image plane | ∞ | | | | |

Aspherical surface data
Twenty-first surface

K = 0.00000e+000    A4 = 2.13570e−005    A6 = −2.67694e−008
A8 = 2.07658e−010   A10 = −1.60296e−012  A12 = 3.19219e−015

| | |
|---|---|
| Focal length | 33.30 |
| F-number | 2.30 |
| Half field angle (degree) | 28.07 |
| Image height | 17.76 |
| Entire lens length | 105.67 |
| BF | 10.14 |
| Entrance pupil position | 26.28 |
| Exit pupil position | −39.79 |
| Front principal point position | 32.72 |
| Rear principal point position | −31.80 |

| Single lens data | | |
|---|---|---|
| Lens | First surface | Focal length |
| 1 | 1 | 0.00 |
| 2 | 3 | −52.26 |
| 3 | 5 | −70.71 |
| 4 | 7 | 29.42 |
| 5 | 9 | −14.23 |
| 6 | 10 | 23.44 |
| 7 | 13 | 28.28 |

-continued

| Unit mm | | |
|---|---|---|
| 8 | 15 | −16.11 |
| 9 | 16 | 28.84 |
| 10 | 18 | 34.77 |
| 11 | 20 | −33.27 |
| 12 | 22 | 77.64 |
| 13 | 24 | 0.00 |

TABLE 1

| | | Example | | | | |
|---|---|---|---|---|---|---|
| | | 1 | 2 | 3 | 4 | 5 |
| Conditional Expression (1) | f1/f3 | 0.84 | 0.54 | 0.33 | 0.37 | 0.49 |
| Conditional Expression (2) | fGr/f3 | −2.11 | −1.04 | −1.03 | −1.64 | −1.34 |
| Conditional Expression (3) | L/f | 3.71 | 2.24 | 3.86 | 5.34 | 3.17 |
| Conditional Expression (4) | GfR1/f | 0.53 | 0.44 | 0.64 | 0.69 | 0.47 |
| Conditional Expression (5) | f2/f | 1.36 | 0.70 | 1.23 | 1.66 | 1.04 |
| Conditional Expression (6) | fGf/f | −0.93 | −0.73 | −1.30 | −2.01 | −1.00 |
| Conditional Expression (7) | L23/f | 0.37 | 0.38 | 0.48 | 0.56 | 0.44 |
| Lens A1 | θgFi | 0.5340 | 0.54 | 0.5340 | 0.54 | 0.5340 |
| | vdi | 94.9 | 67.70 | 94.9 | 67.70 | 94.9 |
| Conditional Expression (8) (A1) | | 0.6289 | 0.5951 | 0.6289 | 0.5951 | 0.6289 |
| Lens A2 | θgFi | 0.5375 | — | 0.5375 | 0.5375 | 0.5375 |
| | vdi | 81.5 | — | 81.5 | 81.5 | 81.5 |
| Conditional Expression (8) (A2) | | 0.6107 | — | 0.6107 | 0.6107 | 0.6107 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-106958, filed May 27, 2015, which is hereby incorporated by reference herein in its entirety.

What is claimed is:

1. An image pickup optical system having a focal length, comprising:
   a first lens unit having a negative refractive power;
   a second lens unit having a positive refractive power; and
   a third lens unit having a negative refractive power,
      the first lens unit, the second lens unit, and the third lens unit being arranged in the stated order from an object side to an image side,
   wherein the first lens unit consists of one negative lens or two negative lenses,
   wherein the second lens unit includes a plurality of lenses which include a positive lens closest to the object side, wherein the third lens unit consists of a negative lens and a positive lens, which are arranged in the stated order from the object side to the image side, wherein the focal length of the image pickup optical system is fixed, and the following conditional expressions are satisfied:

$0.30<f1/f3<0.90;$ $-2.20<fGr/f3<-1.00;$ $2.00<L/f<7.00;$ and $0.30<GfR1/f<0.85,$ where f1 represents a focal length of the first lens unit, f3 represents a focal length of the third lens unit, fGr represents a focal length of the positive lens included in the third lens unit, L represents an entire lens length, f represents the focal length of the image pickup optical system, and GfR1 represents a distance on an optical axis from a lens surface on the object side of the negative lens included in the third lens unit to an image plane.

2. An image pickup optical system according to claim 1, wherein the following conditional expression is satisfied:

$0.55<f2/f<1.75,$ where f2 represents a focal length of the second lens unit.

3. An image pickup optical system according to claim 1, wherein the following conditional expression is satisfied:

$-2.20<fGf/f<-0.60,$ where fGf represents a focal length of the negative lens included in the third lens unit.

4. An image pickup optical system according to claim 1, wherein the following conditional expression is satisfied:

$0.30<L23/f<0.60,$ where L23 represents a distance on an optical axis from a lens surface on the image side of a lens closest to the image side in the second lens unit to a lens surface on the object side of the negative lens included in the third lens unit.

5. An image pickup optical system according to claim 1, wherein at least one negative lens included in the first lens unit satisfies the following conditional expression:

$0.5826<\theta gFi+0.001618\times(vdi-36.23)<0.8000,$ where vdi and θgFi represent an Abbe number and a partial dispersion ratio of a material of the one negative lens or the two negative lenses included in the first lens unit, respectively.

6. An image pickup optical system according to claim 1, wherein the second lens unit includes, in order from the object side to the image side, a positive lens, a cemented lens obtained by cementing a negative lens and a positive lens, a positive lens, a cemented lens obtained by cementing a negative lens and a positive lens, and a positive lens.

7. An image pickup apparatus, comprising:

an image pickup optical system having a focal length; and a solid-state image pickup element configured to receive light of an image formed by the image pickup optical system, the image pickup optical system comprising:

a first lens unit having a negative refractive power;

a second lens unit having a positive refractive power; and a third lens unit having a negative refractive power, the first lens unit, the second lens unit, and the third lens unit being arranged in the stated order from an object side to an image side, wherein the first lens unit consists of one negative lens or two negative lenses, wherein the second lens unit includes a plurality of lenses which include a positive lens closest to the object side, wherein the third lens unit consists of a negative lens and a positive lens, which are arranged in the stated order from the object side to the image side, wherein the focal length of the image pickup optical system is fixed, and the following conditional expressions being satisfied:

$0.30<f1/f3<0.90;$ $-2.20<fGr/f3<-1.00;$ $2.00<L/f<7.00;$ and $0.30<GfR1/f<0.85,$ where f1 represents a focal length of the first lens unit, f3 represents a focal length of the third lens unit, fGr represents a focal length of the positive lens included in the third lens unit, L represents an entire lens length, f represents the focal length of the image pickup optical system, and GfR1 represents a distance on an optical axis from a lens surface on the object side of the negative lens included in the third lens unit to an image plane.

* * * * *